(12) United States Patent
Khan et al.

(10) Patent No.: US 11,433,381 B1
(45) Date of Patent: Sep. 6, 2022

(54) EFFICIENT CATALYSTS FOR HYDROGEN PRODUCTION

(71) Applicant: King Abdulaziz University, Jeddah (SA)

(72) Inventors: Sher Bahadar Khan, Jeddah (SA); Mohammad Sherjeel Jhaved Khan, Jeddah (SA); Tahseen Kamal, Jeddah (SA); Abdullah Mohamed Asiri, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/471,510

(22) Filed: Sep. 10, 2021

(51) Int. Cl.
*B01J 31/06* (2006.01)
*B01J 35/02* (2006.01)
*B01J 37/02* (2006.01)
*B01J 37/06* (2006.01)

(52) U.S. Cl.
CPC ............ *B01J 31/06* (2013.01); *B01J 35/023* (2013.01); *B01J 35/026* (2013.01); *B01J 37/0221* (2013.01); *B01J 37/06* (2013.01)

(58) Field of Classification Search
CPC ........ B01J 31/06; B01J 35/023; B01J 35/026; B01J 37/0221; B01J 37/06
See application file for complete search history.

(56) References Cited

U.S. PATENT DOCUMENTS

| 6,322,724 B1 * | 11/2001 | Sanderson ............ C09K 17/32 |
| | | 252/194 |
| 2011/0086949 A1 | 4/2011 | Mentink et al. |
| 2020/0368570 A1 * | 11/2020 | Hodgen ............... A62D 1/0064 |
| 2021/0015125 A1 | 1/2021 | Ahnoff et al. |

FOREIGN PATENT DOCUMENTS

| DK | 2389075 T3 | 2/2018 |
| PL | 430871 A1 * | 2/2021 |
| WO | 2010/080557 A1 | 7/2010 |

OTHER PUBLICATIONS

Fernandes et al: Development of alginate/starch-based hydrogels crosslinked with different ions: Hydophilic, kinetic and spectroscopic properties, Materials Today, vol. 21, Dec. 2019.
Kafshgari et al: "Perparation of alginate and chitosan nanoparticles using a new reversie micellar system", Iranian Polymer Journal, vol. 21, pp. 99-107, 2012.
Ozturk et al: "Highly regenerable ionic liquid microgels as inherently metal-free green catalyst for H2 generation", Polymers Advanced Technologies, Jan. 23, 2018.
Sahiner et al: "Very fast H2 production from the methanolysis of NaBH4 by metal-free poly(ethylene imine) microgel catalysts", International Jouranal or Energy Research, Oct. 27, 2016.

(Continued)

*Primary Examiner* — James A Fiorito
(74) *Attorney, Agent, or Firm* — WC&F IP

(57) ABSTRACT

Catalysts for hydrogen production from $NaBH_4$ by hydrolysis or alcoholysis are provided. The catalysts comprise hydrogel beads formed from alginate and starch. The hydrogel beads optionally comprise metal nanoparticles on their surfaces, and the hydrogen generation reactions are optionally conducted in the presence of one or more surfactants.

10 Claims, 6 Drawing Sheets

(56) References Cited

OTHER PUBLICATIONS

Sahiner et al: "Metal-free pyridinium-based polymeric ionic liquids as catalyst for H2 generation from NaBH4", Renewable Energy, vol. 101, pp. 1005-1012, Feb. 2017.
Zinfeng et al: "Synthesis of cadium, lead and copper alginate nanobeads as immunosensing probes for the detection of AFP, CEA, and PSA", Biosensors and Bioelectronics, vol. 70, pp. 98-105, Aug. 15, 2015.

* cited by examiner

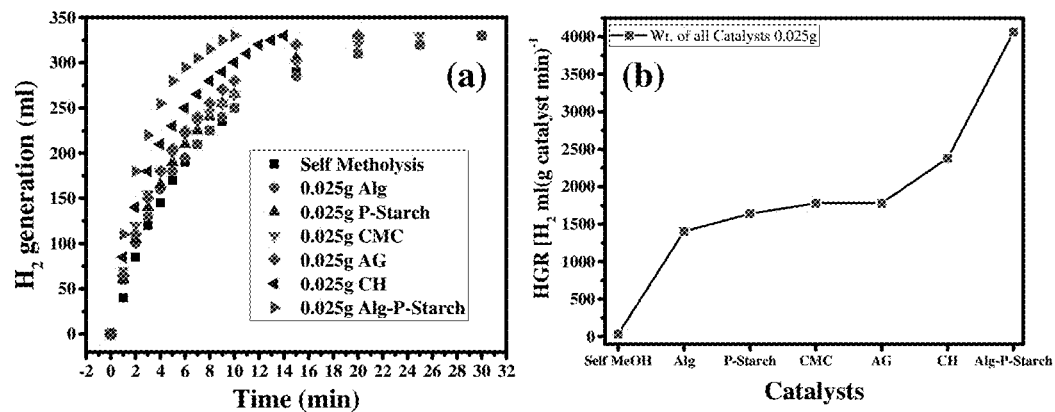
Figure 4A
Figure 4B
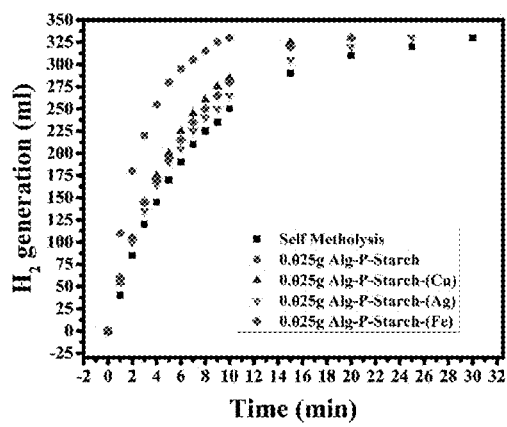
Figure 5A
Figure 5B

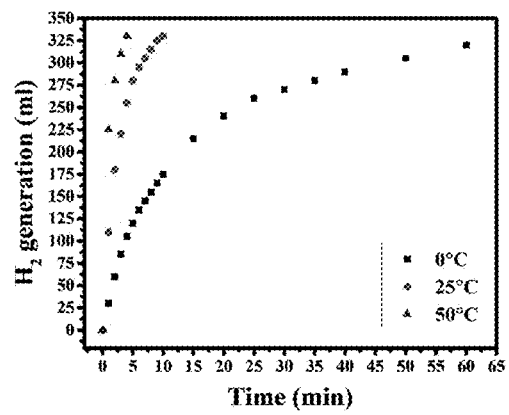
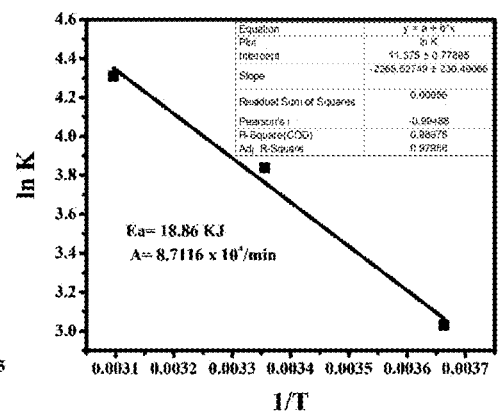
Figure 8A
Figure 8B
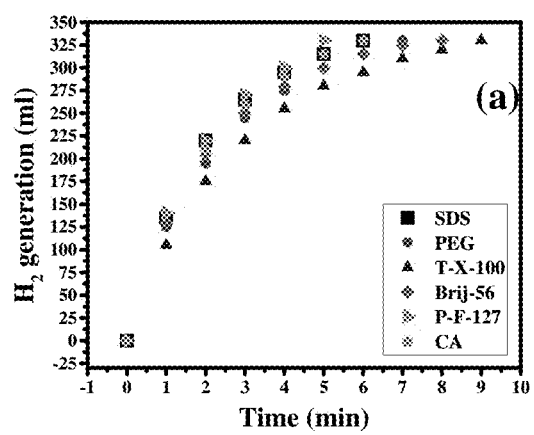
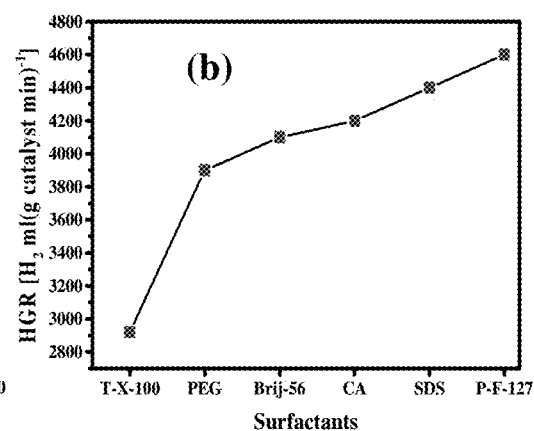
Figure 9A
Figure 9B

EFFICIENT CATALYSTS FOR HYDROGEN PRODUCTION

BACKGROUND OF THE INVENTION

Field of the Invention

The invention generally relates to catalysts for hydrogen production from $NaBH_4$ and water or an alcohol. In particular, the invention provides catalysts comprising hydrogel beads formed from alginate and starch. The hydrogel beads optionally comprise metal nanoparticles on their surfaces, and the hydrogen generation reactions are optionally conducted in the presence of one or more surfactants.

Description of Related Art

The major challenge to the world is to produce environmentally friendly sustainable energy sources. In future, the predicted global population by 2050 would be increased by 36%, whereas the energy utilization will increase by 77% during the same period [1]. The ever-growing anxieties over oil shortages and greenhouse gas emissions are pivotal issues from environmental and economic perspective [2]. To overcome these problems, $H_2$ is one of the reliable and environmentally friendly chemical materials utilized in various chemical industries i.e., fuel cells, the metallurgical industry, in the manufacture of polymers, and refineries etc. for modern power systems. $H_2$ production has received great attention because of its clean and carbon free nature [1]. Due to the high global energy demand and swift reduction of fossil fuels, searching for renewable and clean energy like $H_2$ has received great attention and considerable importance [2-7].

Several efforts have been explored for $H_2$ production. For instance, $H_2$ production via different processes have been used, such as fossil fuels [8] and coal gasification processes [9], which were very expensive processes compared to natural gas reforming [10]. Solar energy [11], photovoltaic [12] and greenhouse gas emission [13] processes have also been studied for producing hydrogen gas. However, the cost of electricity from wind and solar is higher than that of natural gas. Biomass syngas [14] has also been utilized for producing $H_2$ gas. $H_2$ generation through thermolysis has also been studied [15]. Kim et al. (2008) [16] and Mao et al. (2010) [17] studied $H_2$ production by heating $Ca(BH_4)_2$. However, $Ca(BH_4)_2$ has been predicted theoretically to have limited feasibility due to the formation of a stable intermediate compound of $CaB_{12}H_{12}$ [18]. Lithium aluminum hydrides [15,19,20] have also been used in hydrolysis reactions for $H_2$ production. However, there are major drawbacks in lithium hydride hydrolysis such as the formation of the byproduct lithium hydroxide. Various precious metal catalysts like platinum, ruthenium and rhodium which were utilized as a support material have been used to study the hydrolysis of $NaBH_4$, for instance, ruthenium (Ru) supported on ion exchange resin IRA-400 [21]. The main drawback of using ruthenium catalysts is their activity which is reduced in alkaline solutions or affected by NaOH in solution. On the other hand, the lack of these precious metal-based materials and their high cost make them unattractive for large-scale water splitting applications and hydrogen storage systems [22].

The continuous quest for cheap, effective, metal free and non-noble metal-based catalysts has prompted additional research for $H_2$ production. Several methods and catalysts have been used but $H_2$ production from water and methanol should be the essential first task to achieve fuel production using hydrides as a hydrogen source. $H_2$ production by using chemical hydrides has gained enormous attention because of their high $H_2$ content, cost-effective, nontoxic and recyclable nature. However, proficient catalysts are required for hydrolytic reactions that could catalyze $H_2$ production from these hydrides at room temperature. Most of the current catalysts are based on expensive materials, including noble metals or those that are less abundant. Moreover, replacement of some of the present metal-containing catalysts for sustainable materials derived from renewable resources would be of high impact from the strategic point of view for the chemical industry. Thus, different catalysts for $H_2$ production have been reported. Among different procedures, $H_2$ production from $NaBH_4$ hydrolysis and $NaBH_4$ methanolysis are the more efficient methods. However, $H_2$ production from $NaBH_4$ hydrolysis is very slow and therefore, different catalysts such as metal nanoparticles and non-metal catalysts have been tested for fast and efficient hydrogen production from $NaBH_4$ hydrolysis and $NaBH_4$ methanolysis. In a typical reaction, 4 moles of $H_2$ can be generated from hydrolysis or methanolysis of 1 mole of $NaBH_4$ as given in the following equations [23-25]:

$$NaBH_4 + 2H_2O \rightarrow 4H_2 + NaBO_2 \tag{1}$$

$$NaBH_4 + 4CH_3OH \rightarrow 4H_2 + NaB(OCH_3)_4 \tag{2}$$

Numerous catalysts, based on metals such as Co, Pt, Fe, Ru, Ni, Cu, Ag were used as single metal, bimetallic and trimetallic form for $H_2$ production by hydrolysis/methanolysis of $NaBH_4$. However, some of these catalysts were less stable, non-recyclable, recyclable at high cost, weak in catalytic activity, have high cost, and are less environmentally friendly.

Thus, it is essential to provide other catalysts for $H_2$ production by hydrolysis/methanolysis of $NaBH_4$. In particular, what is needed is catalysts which are inexpensive, stable, and which have high catalytic activity, and which can be utilized repeatedly without losing their catalytic activity.

SUMMARY OF THE INVENTION

The developed catalysts would be of high impact from the strategic point of view for the fuel industries because it can afford certain interesting catalytic performance in fast and high quantity of hydrogen production as well as its relatively simple preparation and low cost will promote its broader application prospect.

Other features and advantages of the present invention will be set forth in the description of invention that follows, and in part will be apparent from the description or may be learned by practice of the invention. The invention will be realized and attained by the compositions and methods particularly pointed out in the written description and claims hereof.

It is an object of this invention to provide a catalyst comprising hydrogel beads formed from crosslinked alginate and a starch. In some aspects, the alginate and the starch are crosslinked by metal atoms. In further aspects, the metal atoms are Al, Mn, Zn or Ca atoms. In additional aspects, the metal atoms are Al atoms. In other aspects, the starch is potato starch. In additional aspects, the hydrogel beads comprise transition metal nanoparticles affixed thereto. In some aspects, the transition metal nanoparticles are Cu, Ag, or Fe nanoparticles.

The invention also provides a catalytic composition comprising catalytic hydrogel beads comprising crosslinked alginate and starch, and water or methanol. In some aspects, the catalytic composition further comprises at least one surfactant. In further aspects, the at least one surfactant is sodium dodecyl sulfate (SDS), polyethylene glycol (PEG), t-octylphenoxypolyethoxyethanol, olyoxyethylene (20) cetyl ether, $(C_3H_6O.C_2H_4O)x$ or citric acid (CA).

Also provided is a method of generating $H_2$ from $NaBH_4$, comprising contacting the $NaBH_4$ with a catalytic composition comprising catalytic hydrogel beads comprising crosslinked alginate and starch, and water or methanol. In some aspects, the catalytic composition further comprises at least one surfactant. In further aspects, the method is conducted with water and the $H_2$ is generated by hydrolysis of the $NaBH_4$. In additional aspects, the method is conducted with methanol and the $H_2$ is generated by methanolysis of the $NaBH_4$. In alternative aspects, the method further comprises the steps of recovering the hydrogel beads, then washing the hydrogel beads, and then repeating the step of contacting with washed hydrogel beads. In some aspects, the steps of recovering, washing and repeating are performed a plurality of times.

BRIEF DESCRIPTION OF THE DRAWINGS

FIGS. 4A and B. $H_2$ generation by methanolysis of $NaBH_4$ in presence/absence of metal free catalysts (a) and HGR values calculated for each metal-free catalyst (b).

FIGS. 5A and B. $H_2$ generation by methanolysis of $NaBH_4$ in presence/absence of metal coated catalysts (a) and HGR values calculated for each metal coated catalyst (b).

FIGS. 8A and B. $H_2$ generation at different temperatures by methanolysis of $NaBH_4$ using Alg-P-Starch as catalyst (a) and HGR values calculated for $H_2$ generation at different temperatures (b).

FIGS. 9A and B. $H_2$ generation by methanolysis of $NaBH_4$ in the presence of different surfactants using Alg-P-Starch as catalyst (a) and HGR values calculated for $H_2$ generation at different temperatures (b).

DETAILED DESCRIPTION

Figure 1:
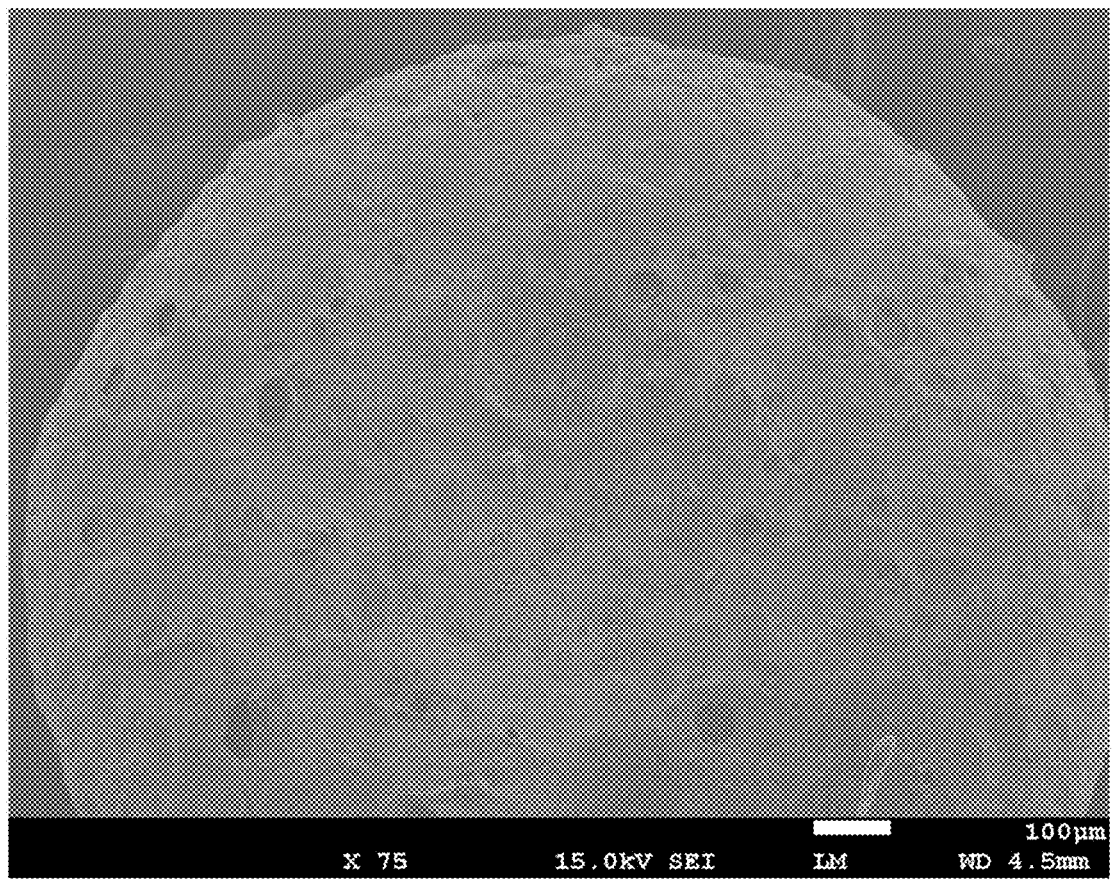
FIG. 1. Field emission scanning electron microscopy (FESEM) image of Alg-P-Starch dried at room temperature.

This disclosure provides effective hydrogen generation systems using efficient and (largely) organic catalysts. Selective, stable and efficient catalysts were designed and developed which boosted the $H_2$ generation and decreased the cost of the $H_2$ generation systems. In this invention, the prepared catalysts, such as, Alg beads, CMC beads, CH hydrogel, AG hydrogel, Alg-P-Starch composite hydrogel beads and Alg-G-Leucine composite hydrogel beads were used as catalysts for hydrogen generation. Among all catalysts, Alg-P-Starch was the most efficient. Additionally, Cu, Ag, and Fe nanoparticles have been grown on the surface of Alg-P-Starch hydrogel beads (M° @ Alg-P-Starch) and used as catalysts. Furthermore, the efficient catalyst i.e. Alg-P-Starch was chosen and processed for $NaBH_4$ hydrolysis and methanolysis. In addition, the effect of different surfactants, different amounts of $NaBH_4$, and the effect of temperature on catalytic activity were also investigated. Moreover, the recyclability of the catalyst was investigated, where no decrease in the production rate of the $H_2$ was noted after multiple cycles of use. Hydrogen ($H_2$) generation from abundant sources such as water and methanol could help meet the goals of Saudi Vision 2030, such as increasing non-oil GDP.

Definitions

Starch is a polymeric carbohydrate consisting of numerous glucose units joined by glycosidic bonds. This polysaccharide is produced by most green plants for energy storage. It is contained in large amounts in staple foods like potatoes, maize (corn), rice, wheat and cassava (manioc). Pure starch consists of two types of molecules: linear and helical amylose and branched amylopectin. Depending on the plant, starch generally contains 20 to 25% amylose and 75 to 80% amylopectin by weight.

Catalyst Compositions and Methods of Making the Same

The present disclosure provides catalytic compositions which are used to produce $H_2$ gas from $NaBH_4$. The catalytic compositions comprise hydrogel particles, such as hydrogel beads, formed from alginate and at least one starch.

In some aspects, the alginate that is used to form the hydrogel is the sodium salt, i.e. Na-alginate. However, other salts of alginate are known and can also be employed e.g. Ca, Mg, K or $NH_4$ salts. Preferably, the salt is the sodium salt.

The starch that is used to form the hydrogel can be any of a wide variety of known and readily available starches, examples of which include but are not limited to: potato, maize (corn), rice, wheat and cassava starch. In a preferred embodiment, the starch is potato starch.

The invention also encompasses methods of making the hydrogel particles of which the catalyst is comprised. Generally, this is done by mixing an alginate solution or suspension (such as Na-alginate in a medium such as deionized water or a suitable buffer) with a starch solution or suspension (such potato starch in a medium such as deionized water or a suitable buffer). The alginate solution and the starch solution are of a concentration so that, after mixing, a solution is created in which the alginate is present at about 10% wt/vol (10 g/100 ml), and the starch solution is present at about 5.6% wt/vol (5.6 g/100 ml). These amounts vary up or down (increase or decrease) by about e.g. 1-50%, such as by about 1, 5, 10, 15, 20, 25, 30, 34, 40, 45 or 50%, depending on e.g. other components used in a formulation. The mixture that is formed is viscous and is then added dropwise to a suitable crosslinking reagent in liquid form. For example, the mixture is added dropwise to a solution of a crosslinking reagent in water. Suitable crosslinking reagents are generally metal salts and include but are not limited to: $AlCl_3$, $MnCl_2$, $ZnCl_2$, $CaCl_2$, $FeCl_3$, $CeCl_2$ etc. Preferably, the crosslinking reagent is $AlCl_3$.

The formation of hydrogel beads in the crosslinking solution can be allowed to proceed for a period of time such as from 1-24 hours. Thereafter, the hydrogel beads can be optionally dried (e.g. at room temperature) and stored pending rehydration and further modification or use.

The dimensions of the hydrogel beads are generally in the range of from about 100 mm to about 200 mm.

In some aspects, the hydrogel particles are modified by attaching metal ions to their surfaces, i.e. the hydrogels are "decorated" with metal nanoparticles, generally transition metal particles. Suitable metals for this purpose include but are not limited to: Cu, Ag, Fe, Ni, Co, etc. For this modification, the metals are generally used in a salt form such as $CuSO_4 \cdot 5H_2O$, $FeSO_4 \cdot 7H_2O$, $AgNO_3$, etc. and may be provided in a solution ranging from about 0.01 to about 0.1M, such as a 0.05M solution. The hydrogel particles are placed in the metal solution and allowed to react for a period of time ranging from about 1 to 12 hours to allow adsorption of metal ions to the beads. Generally, it is the ionic forms of the metals (e.g. $Cu^{2+}$, $Fe^{2+}$, $Ag^+$) that attach to the hydrogel.

Metal adsorbed beads are then generally further processed by exposure to a strong reducing agent to convert the metal ions (e.g. $Cu^{2+}$, $Fe^{2+}$, $Ag^{2+}$) into the corresponding metal (e.g. $Cu^0$, $Fe^0$, $Ag^0$) nanoparticles. Examples of strong reducing agents that can be used include but are not limited to $NaBH_4$ (in a 0.2M aqueous solution). The level of metal nanoparticle modification is generally in the range of from about 1 to about 200 $mgg^{-1}$ and depends on the type of metal that is used. For example, Ag+ has a relatively high uptake capacity (e.g. about 150 $mgg^{-1}$) whereas that of $Cu^{+2}$ (about 13 $mgg^{-1}$) and $Fe^{+3}$ (about 3 $mgg^{-1}$) were lower. The metal ions uptake capability of the beads was calculated using following equation:

$$q_e = \frac{(C_i - C_e) * V(L)}{m(g)}$$

where $q_e$ is the amount of adsorbed metal ions by beads ($mgg^{-1}$), $C_i$ and $C_e$ are the initial and final concentration of metal ions in aqueous solution ($mgL^{-1}$), V is the volume (L) of solution and m is the mass (g) of the beads.

The highest uptake capacity of beads was for $Ag^+$, which reached to 149.82 $mgg^{-1}$. By experimenting the adsorption of $Cu^{+2}$ and $Fe^{+3}$ by beads, it was observed that $Fe^{+3}$ has the lowest adsorption capacity (2.59 $mgg^{-1}$). Uptake capacity of $Cu^{+2}$ was 12.87 $mgg^{-1}$.

After formation, the metal-modified hydrogel particles may be optionally dried and stored (e.g. at room temperature) and then rehydrated prior to use as catalysts.

The catalytic compositions of the invention are formed by mixing hydrogel particles (which may or may not have adsorbed metals) with $NaBH_4$ in a suitable liquid medium. In some aspects, the liquid medium itself is a source of H atoms and contributes to the reaction that produces $H_2$ from $NaBH_4$. For example, in some aspects, the medium is water and the $NaBH_4$ undergoes hydrolysis by reacting with water molecules. In other aspects, the medium is an alcohol and the $NaBH_4$ undergoes alcoholysis by reacting with alcohol molecules. In some aspects, the alcohol is methanol, ethanol, or propanol, and the equations involved in the hydrolysis and methanolysis reactions are:

$NaBH_4 + 4H_2O \rightarrow 4H_2 + NaB(OH)_4$ $NaBH_4 + 4CH_3OH \rightarrow 4H_2 + NaB(OCH_3)_4$ In some aspects, a mixture of an alcohol and water is used as the medium. In some aspects, the catalytic compositions comprise, in addition to hydrogel beads and $NaBH_4$ in a medium (preferably a medium that can donate H atoms for the production of $H_2$) at least one surfactant, for example, an anionic surfactant, a cationic surfactant, a nonionic surfactant, or an amphoteric surfactant.

Suitable surfactants include but are not limited to: sodium dodecyl sulfate (SDS), polyethylene glycol (PEG), Triton™ X-100, Brij®-56, Pluronic® F-127 and citric acid (CA), and combinations of these.

Synonyms for Triton™ X-100 include T-X-100, t-octylphenoxypolyethoxyethanol and polyethylene glycol tert-octylphenyl ether. The linear formula is t-Oct-$C_6H_4$—$(OCH_2CH_2)xOH$, x=9-10.

Synonyms for Brij®-56 include olyoxyethylene (20) cetyl ether and polyethylene glycol hexadecyl ether. The linear formula is $HO(CH_2CH_2O)_{20}C_{16}H_{33}$.

Synonyms for Pluronic® F-127 include P-F-127. The linear formula $(C_3H_6O \cdot C_2H_4O)x$. The PubChem ID number 24897874.

Other exemplary surfactants that may be used include but are not limited to: emulsifying agents or surfactants such as anionic triethanolamine/potassium stearate, sodium lauryl stearate, sodium cetearyl sulfate, beeswax/borax, nonionic glycerol di-stearate, polyethyleneglycol-100-stearate, steareth-2, steareth-21, and cationic surfactants including but not limited to distearyldimethylammonium chloride, benzalkonium chloride, steapyrium chloride, polyquaternium-37, acrylates/C10-30, alkyl acrylate, polyacrylamide, propylene glycol, dicaprylate/dicaprate and PPG-1 trideceth-6 and silicone-based materials including but not limited to alkyl modified dimethiconecopolyols, polyglyceryl esters and ethoxylated di-fatty esters. Also included are ionic polysorbate surfactants such as polysorbate 20, polysorbate 40, polysorbate 60, polysorbate 80; ether-based surfactants including but not limited to steareths, laureths, oleths, ceteths; and other emulsifiers or surfactants known to the person skilled in the art, or any combinations thereof. The preferred quantity of the emulsifiers or surfactant in the is in the range of about 0.1% w/w to about 20% w/w and more preferably 0.1% to 10% of the total formulations. Also included are surfactants disclosed in published US patent applications 20210186881 and 20200247960, the complete contents of both of which are hereby incorporated by referenced in entirety.

Methods of Producing $H_2$

The present disclosure also provides methods of making (producing) $H_2$ gas from $NaBH_4$ using the catalysts and catalytic compositions described herein. The methods generally involve contacting the $NaBH_4$ with a catalytic composition comprising catalytic hydrogel beads formed from crosslinked alginate and a starch, and water or methanol. The catalytic hydrogel beads may have metal nanoparticles adsorbed thereto. In some aspects, the catalytic composition also includes at least one surfactant. In some aspects, the method is conducted with (in) water and the $H_2$ is generated by hydrolysis of the $NaBH_4$. In other aspects, the method is conducted with methanol and the $H_2$ is generated by methanolysis of the $NaBH_4$.

Experiments described in the Examples section below confirmed that the catalytic hydrogel beads disclosed herein are recyclable, i.e. they can be used, recovered, washed and reused for e.g. at least about 5 reaction cycles, and typically for at least about 5, 10, 15, 20 or more reaction cycles. The methods thus also include steps of recovering the hydrogel beads, then washing the hydrogel beads, and then repeating the step of contacting with hydrogel beads that have been washed to remove excess reactants, etc. ("washed hydrogel beads"). In some aspects, the steps of recovering, washing and repeating are performed a plurality of times. For example, they may be performed at least about 5, 10, 15 or 20 times or more, without appreciable loss of catalytic activity, such as with a loss of less than 50, 40, 30, 20, 10 or 5% activity, or the loss of no activity. Further, after washing the beads, the reaction may be slower to start or take longer overall to achieve the same amount of $H_2$ generation, but ultimately the same amount of $H_2$ is produced as is the case for new beads that have not been previously used.

Uses of the $H_2$

The developed catalysts have interesting catalytic performance along with high stability and recyclability. These catalysts promote efficient hydrogen generation with high stability, boost $H_2$ generation efficiently and decrease the cost of $H_2$ production. The catalysts are of high impact from a strategic point of view for fuel industries because they afford certain interesting catalytic performance in rapid, high quantity hydrogen production, as well as relatively simple preparation and low cost which promotes broad application. Hydrogen economy is very promising for the future and can foster carbon-neutral energy. Moreover, catalysts of this type reduce dependence on conventional fuels. This catalytic system can be used for hydrogen production that is usable for clean energy sources. This present system provides abundant and in expensive catalysts for hydrogen production from water and methanol, thereby reducing carbon emissions and other noxious gases.

Systems which use these catalysts provide high purity hydrogen without any impurities and so can be used for various purposes such as industrial processes, residential applications, electrochemical energy conversion devices, space applications, military applications, automobiles, electronic devices, chemical and petroleum industries, hydrogenation of fats and oils, welding, reduction of metallic ores, rocket fuel, rotor coolant in electrical generators, etc. In some aspects, the $H_2$ gas generated as described herein is cooled and liquified. Liquid $H_2$ has many applications as fuel, e.g. such as fuel for rockets, submarines, etc. Accordingly, the present disclosure also provides liquid hydrogen fuels made by cooling the $H_2$ gas generated by the methods described herein to below 33K. However, for it to be in a fully liquid state at atmospheric pressure, $H_2$ needs to be cooled to 20.28 K (−252.87° C.; −423.17° F.). The liquid $H_2$ is then stored and until it is used as fuel.

It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

EXAMPLE

Materials and Methods

Sodium alginate (Alg), carboxymethylcellulose sodium (CMC), agarose (AG), chitosan (CH), potato starch (P-starch) and glycyl leucine (G-leucine) all were purchased from Sigma Aldrich. Pure anhydrous aluminium chloride ($AlCl_3$, 90%), sodium borohydride ($NaBH_4$, 97%), copper sulphate pentahydrate ($CuSO_4.5H_2O$), iron sulphate heptahydrate ($FeSO_4.7H_2O$) and silver nitrate ($AgNO_3$) were purchased from Fluka, UK.

Alg, CMC, Alg-P-Starch, and Alg-G-Leucine hydrogel beads were prepared by cross linking with $AlCl_3$. During sample preparation, 10.0% w/v of Alg, 2.0% w/v of CMC, and 5.6% w/v of potato starch and glycyl leucine were used. $AlCl_3$ (2.0 M) solution was prepared in water and used as a cross linker for the preparation of these beads. Then for preparation of Alg and CMC beads, a 5 mL syringe was filled with each viscous solution and the solution was poured dropwise into 2.0 M solution of $AlCl_3$. Each drop turned into spherical beads upon touching the surface of the $AlCl_3$ solution. This formation takes place due to ionic crosslinking between $Al^{+3}$ and polymer chains. The hydrogel beads were left for 24 hrs in $AlCl_3$ solution and finally dried at room temperature.

To prepare the blended hydrogel beads of Alg-P-Starch, and Alg-G-Leucine, a 20 mL of Alg solution was individually mixed with 10 ml of potato starch or 10 ml of G. Leucine solution with continuous magnetic stirring. The two solutions were placed in separate syringes and each was gradually poured dropwise into an $AlCl_3$ solution to prepare beads. Each drop of Alg-P-Starch and Alg-G-Leucine solution turned into a round bead after putting it in $AlCl_3$ solution due to the crosslinking of the polymer chains. Alg-P-Starch and Alg-G-Leucine beads were kept overnight in $AlCl_3$ solution for complete cross-linking. The prepared beads were ultimately separated and cleaned thoroughly with DI water for removing excess and unreacted $Al^{3+}$ ions present on the external surface of the beads and then both types of beads were dried in open air at room temperature.

For the decoration of metal nanoparticles (MNPs) on the surface of the fabricated Alg-P-Starch, three different metal salt solutions were prepared. Before, the adsorption of MNPs on the bare Alg-P-Starch beads, the beads were washed three times to remove the excess $Al^{+3}$ ions from the $AlCl_3$ solution that were adsorbed at the surface. 0.2 g of Alg-P-Starch hydrogel beads were added individually into $CuSO_4.5H_2O$, $FeSO_4.7H_2O$ and $AgNO_3$ solutions (each with a concentration of 0.05M) and kept overnight in the metal salt solutions to allow adsorption of metal ions to the beads. Beads acquired the color of the particular salt solution which indicated the adsorption of metal ions by the beads. The beads were taken out from the salt solution and washed several times to remove the un-adsorbed metal from the beads. The metal adsorbed beads were further dipped in $NaBH_4$ aqueous solution (0.2M) and the color of the beads changed to black because $NaBH_4$, being a strong reducing agent, causes the reduction of the adsorbed metal ions ($Cu^{2+}$, $Fe^{2+}$, $Ag^+$) into the corresponding metal ($Cu^0$, $Fe^0$, $Ag^0$) NPs.

Alg hydrogel beads, CMC beads, CH hydrogel, AG hydrogel, Alg-P-Starch hydrogel beads, Alg-G-Leucine hydrogel beads, pure potato starch and $M^0@$ Alg-P-Starch were tested as catalysts for hydrogen generation. In a typical hydrogen generation experiment, the required amount of $NaBH_4$ in powder form was placed in a double neck round bottom flask fitted with an outlet tube for collecting the evolved hydrogen gas while the other opening was sealed with a rubber septum. The required amount of alcohol (methanol) was added via syringe into the flask to start hydrogen generation. The outlet tube exhaust from the reaction vessel was placed under an inverted, water-filled, graduated cylinder to collect and simultaneously measure the quantity of hydrogen released at any particular time.

Methanolysis experiments were also performed at various temperatures ranging from 0-50° C. using a thermostatic bath that could be controlled to ±1° C. For carrying out experiments in the presence of catalyst, the required catalyst quantities were added into the solvent. In a typical experiment, 0.1516 g of $NaBH_4$ was placed in a round bottom flask, and 40 ml of methanol was added into it to study the methanolysis reactions. Methanolysis reactions were carried out with 0.025 g of the various catalysts.

The experiment for $H_2$ production from methanolysis of $NaBH_4$ was run in a round bottom flask of 250 mL as a reaction vessel in the absence/presence of 0.025 g catalysts using 40 mL methanol with 0.1516 g of $NaBH_4$ under 1000 rpm mixing rate at room temperature. Moreover, the same reaction conditions were maintained to test the presence of various surfactants such as SDS, PEG, T-X-100, Brij™-56, P-F-127, and CA. Furthermore, $H_2$ production from $NaBH_4$ methanolysis reactions were also analyzed by exploiting different amounts of the catalyst (0.025-0.10 g), different $NaBH_4$ (0.038-0.1516 g) amounts, and at a temperature range of (0-50° C.). The 330 ml of $H_2$ production from methanolysis of $NaBH_4$ without a catalyst took 30 min Results Among all the prepared catalysts, Alg-P-starch was the most efficient and stable catalyst. Therefore, the surface morphology of Alg-P-starch catalyst was analyzed by means of scanning electron microscopy (SEM). An X-ray diffraction profile was collected in the 2 θ angle between 5° and 80°, at a step width of 0.02° and by counting 10 s at each step with Cu-Ka radiation (λ=1.5418 Å). Infrared spectra (FTIR) were obtained at room temperature.

Biopolymers like alginate, CH, and CMC were chosen to develop catalysts that are alternatives to metal-based catalysts. The main reason behind the selections were that the components are readily available, inexpensive, and easily crosslinked via cations so that toxic organic based crosslinkers were avoided. The developed catalysts, such as, Alg hydrogel beads, CMC beads, CH hydrogel, AG hydrogel, Alg-P-Starch composite hydrogel beads and Alg-G-Leucine composite hydrogel beads were used as catalysts for hydrogen generation.

Among all catalysts, Alg-P-Starch was the most efficient and stable. Therefore, we further grew Cu, Ag, and Fe nanoparticles on the surface of Alg-P-Starch hydrogel beads (M0@ Alg-P-Starch) and the resulting catalysts were tested. Further, the most efficient catalyst i.e. Alg-P-Starch, was selected, characterized by different spectroscopic techniques and processed for $NaBH_4$ hydrolysis and methanolysis.

Surface morphologies of Alg-P-Starch were observed as shown in FIG. 1. The average bead size was 1.0–1.5 mm as is clear from the FESEM image. The surface roughness was checked and found to be in the form of wrinkles and grooves on the surface of the Alg-P-Starch bead. FESEM images of Alg-P-Starch depict wrinkles and grooves on the surface, indicating that Alg-P-Starch possess a neat and clean surface.

Figure 2A:
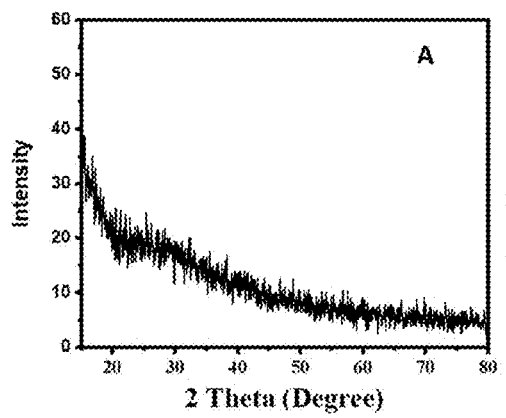
FIGS. 2A and B. X-ray diffraction (XRD) pattern (A) and Attenuated total reflectance-Fourier transform infrared spectroscopy (FTIR-ATR) spectrum (B) of Alg-P-Starch.

FIG. 2(a) displays an XRD pattern of Alg-P-Starch. The XRD pattern lacks any distinct peak but shows only a comprehensive peak demonstrating that Alg-P-Starch is amorphous. Alg-P-Starch showed a broad peak at 25° C. which indicates that the beads are amorphous in nature without any crystallinity.

Figure 2B:
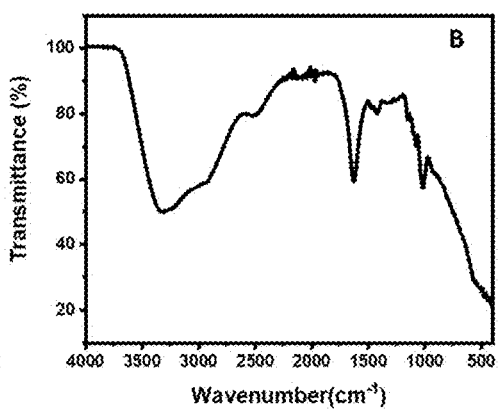

The FTIR-ATR spectrum of Alg-P-Starch is presented in FIG. 2(b). Alg-P-Starch showed peaks at 3380 cm$^{-1}$ (O—H and N—H stretching), 2934 cm$^{-1}$ (C—H stretching), 1650 cm$^{-1}$ (O—H bending), and 1023 cm$^{-1}$ (C—O stretching). The analysis was performed using various tools and confirmed the successful synthesis of Alg-P-Starch beads.

For $H_2$ production, many hydrides have been examined Among these hydrides $NaBH_4$ is considered to be the most suitable because of it is readily commercially available, non-flammable, stable, its side products can be recycled, and the presence of high $H_2$ storage [39]. In the past, the hydrolysis of $NaBH_4$ for high generation of $H_2$ required expensive catalysts. Also, at low temperatures the hydrolysis of $NaBH_4$ is very slow by MNPs, while at 0° C., this reaction is not even possible. Temperature plays a vital role in $H_2$ gas generation for the purpose actual time applications [40]. Therefore, scientists have oriented their attention towards methanol which has a low freezing point i.e −97.6° C. [36,37].

Figure 3A:
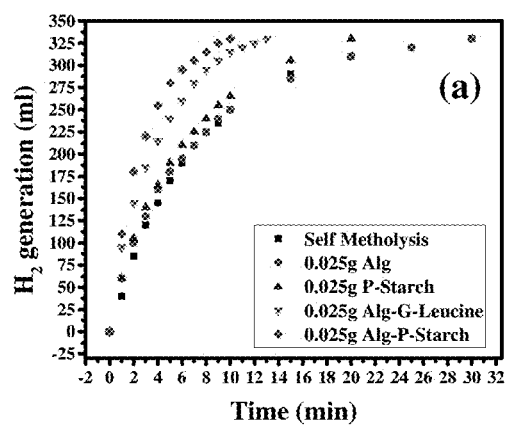
FIGS. 3A and B. $H_2$ generation by methanolysis of $NaBH_4$ in presence/absence of metal free catalysts (a) and Hydrogen generation rate (HGR) values calculated for each metal-free catalyst (b).
Figure 3B:
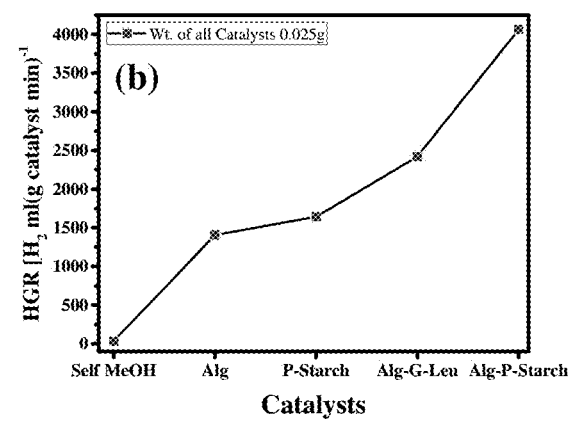

The catalytic efficiency of Alg beads, CMC beads, CH hydrogel, AG hydrogel, Alg-P-Starch hydrogel beads, Alg-G-Leucine hydrogel beads, potato starch and M0@Alg-P-Starch hydrogel beads were investigated using $CH_3OH$ in the presence of NaBH₄ for H₂ generation. For the selection of an efficient catalyst, the efficiency of Alg beads, CMC beads, CH hydrogel, AG hydrogel, Alg-P-Starch hydrogel beads, Alg-G-Leucine hydrogel beads, potato starch and M° @Alg-P-Starch hydrogel beads were investigated via methanolysis of NaBH₄ at room temperature. FIG. 3a shows the volume of H₂ generated during the methanolysis of NaBH₄ using the Alg, P-Starch, Alg-G-Leucine and Alg-P-Starch catalyst beads. The HGR (hydrogen generation rate) was calculated for each catalytic reaction. FIG. 3b shows the HGR values for each of the indicated catalysts. Alg-P-Starch hydrogel beads were the most efficient; the highest HGR of 4000 (H₂ ml/gmin-1) was achieved as shown in FIG. 3b. Further, the Alg-P-Starch hydrogel bead catalyst was studied in detail for H₂ generation from NaBH₄ hydrolysis reactions. Moreover, the generation of H₂ gas was further analyzed using different surfactants and polymers, various dosages of the catalyst, and varying amounts of the NaBH₄. The effect of temperature was also assessed.

The hydrolysis of sodium borohydride is a spontaneous and exothermic process but is very slow without a catalyst. It takes more than a day for the reaction to be completed even with a large excess of water at room temperature. In an experiment on the hydrolysis of sodium borohydride with water in the absence of catalyst, the reaction proceeded with less than 15% efficiency, even in the presence of a large excess of water. The equations involved in the hydrolysis and alcoholysis are given as:

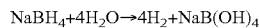

$$NaBH_4 + 4H_2O \rightarrow 4H_2 + NaB(OH)_4$$

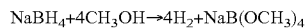

$$NaBH_4 + 4CH_3OH \rightarrow 4H_2 + NaB(OCH_3)_4$$

A simple experimental procedure was followed for hydrogen generation from CH₃OH. H₂ was produced in a round bottom flask of 250 mL, the gas emerged from the flask through a rubber tube of 20 cm in length and was collected in a 500 ml calibrated cylinder fixed in a water tub. The production rate of H₂ was examined using NaBH₄ with and without. A total volume of 40 ml of CH₃OH was tested against each batch of catalyst. The production of H₂ gas was measured from the decrease in the volume of the water in the calibrated cylinder at 1-minute intervals for 10 min and after that at 5 min intervals.

The production rate of H₂ was examined, for which 0.1516 g of NaBH₄ was added to 40 mL of the CH₃OH, which produced 330 mL of H₂ in 30 min without a catalyst. After addition of different alginate-based catalysts such as Alg beads, Alg-P-Starch hydrogel beads, Alg-G-Leucine hydrogel beads, 330 ml of H₂ was produced in 30 min, 10 min and 13 min (FIG. 3a). Further, the rate was compared with pure P-Starch which produced the same amount of H₂ in 20 min (FIG. 4). Alg-P-Starch hydrogel beads were further compared with CMC beads, CH hydrogel and AG hydrogel. 330 ml of H₂ were produced by CMC beads, CH hydrogel and AG hydrogel in 25 min, 14 min and 20 min, respectively (FIG. 4). The calculated HGR values at around 50% conversion were 1405±3.24, 1780±5.15, 2380±7.19, 1780±3.73, 4060±11.55, 2420±9.04 and 1640±3.91 mL H₂/(g·min) for 0.025 g of Alg beads, CMC beads, CH hydrogel, AG hydrogel, Alg-P-Starch hydrogel beads, Alg-G-Leucine hydrogel beads and potato starch, respectively. The catalytic activity of Alg-P-Starch hydrogel beads was further compared with M°@Alg-P-Starch hydrogel beads where 330 ml of H₂ was produced by Cu°@Alg-P-Starch hydrogel beads, Ag°@Alg-P-Starch hydrogel beads and Fe°@Alg-P-Starch hydrogel beads in 20, 25 and 20 min, respectively (FIG. 5). The calculated HGR values at about 50% conversion were 1760±2.94, 1640±2.94 and 1700±3.68 mL H₂/(g·min) for 0.025 g of Cu°@Alg-P-Starch hydrogel beads, Ag°@Alg-P-Starch hydrogel beads and Fe°@Alg-P-Starch hydrogel beads, respectively.

Effect of Catalyst Amount

Figure 6A:
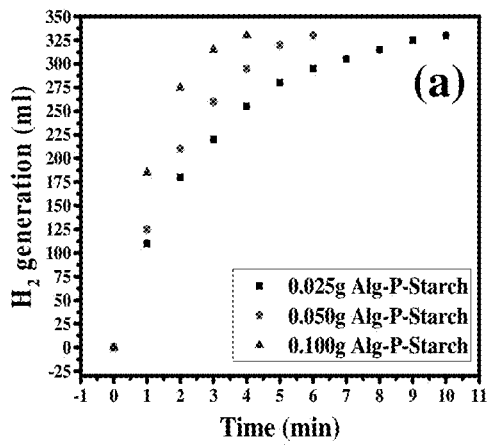
FIGS. 6A and B. $H_2$ generation by methanolysis of $NaBH_4$ using different amounts of Alg-P-Starch (a) and HGR values calculated for different amount of Alg-P-Starch (b).
Figure 6B:
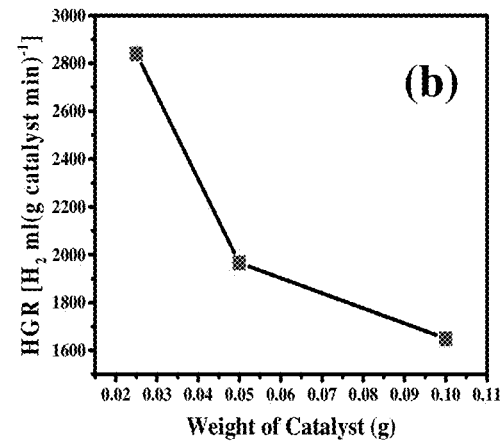

The Alg-P-Starch catalyst shows comparatively high catalytic activity and easily recyclable ability with respect to NaBH₄ methanolysis as compared to all other tested catalysts; hence, different quantities of the Alg-P-Starch catalyst were tested for NaBH₄ methanolysis. The results are shown in FIG. 6 where 0.025, 0.050 and 0.100 g of Alg-P-Starch were exploited using the same amount of NaBH₄ (0.1516 g) and methanol (40 mL). The H₂ generated was measured against time in the presence of each quantity of catalyst. The H₂ generation of 330 mL was completed in 10, 6 and 4 min in the presence of 0.025, 0.050 and 0.100 g of Alg-P-Starch catalyst respectively (FIG. 6). It was observed that increasing the catalyst amount provides a faster H₂ generation rate when tested under the same reaction conditions. The HGR values were calculated for different amounts of Alg-P-Starch catalyst, as are shown in FIG. 6. The calculated HGR values at about 80% conversion were 2840±9.02, 1966±11.86 and 1649±27.42 mL H₂/(g·min) for 0.025 g, 0.05 g and 0.10 g of Alg-P-Starch catalyst, respectively. The HGR values decreased with increasing amounts of the Alg-P-starch catalyst. This might be due to the presence of high catalyst content which increases the competition of the catalyst toward the similar quantity of NaBH₄, ultimately decreasing the HGR value. Alg-P-Starch catalyst (0.025 g) exhibited the highest HGR values at 50% conversion which was 4060±11.55 mL H₂/(g·min).

Effect of NaBH₄ Amount

Figure 7A:
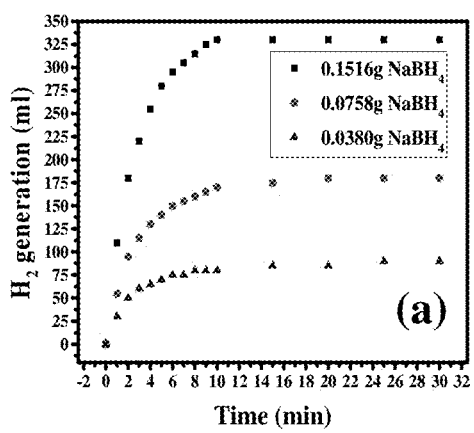
FIGS. 7A and B. $H_2$ generation by methanolysis of different amounts $NaBH_4$ using Alg-P-Starch as catalyst (a) and HGR values calculated for different amount of $NaBH_4$ (b).
Figure 7B:
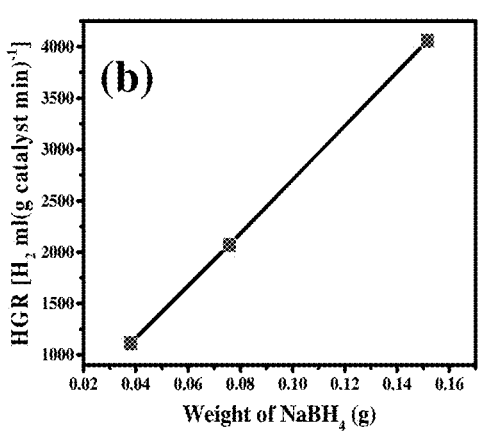

In the next steps, the effect of varying amounts of the NaBH₄ was examined against a fixed amount (0.025 g) of Alg-P-starch catalyst. Different amount of 0.0380, 0.0758, and 0.1516 g of NaBH₄ were used, with 40 mL of CH₃OH. The given amount generated 80, 170 and 330 mL of H₂ in 10 min, respectively. The production of H₂ by introducing 0.0758 g of NaBH₄, was very low in the absence of a catalyst. Therefore, these experimental data confirmed that the production rate of H₂ is highly dependent on the amount of NaBH₄ and thus there is an effect of borohydride concentration on the hydrogen generation rate. It can clearly be observed that hydrogen generation is linear, i.e. hydrogen generation increases with increases in NaBH₄ amounts. The volume of methanol was kept constant in all the experiments (40 ml) but still the efficiency of hydrogen generation was very high, since a high amount of hydrogen is obtained (FIG. 7). As the reaction proceeds and the products accumulate, the pH increases when the amount of NaBH₄ is high. Alkaline solutions of NaBH₄ are stable. However, from the result of higher efficiency of hydrogen generation in all the cases, it can be concluded that the contribution of an increase in pH is negligible in concentrations studies. In order to study the effectiveness of hydrogen generation with subsequent addition of NaBH₄, a test on the step wise addition of substrate was carried out. We took different amount of NaBH₄ to find the effect of stepwise addition of NaBH₄ on the hydrogen generation rates. It was found that the rate varies with the amount of NaBH₄. The calculated HGR values at about 50% conversion were 1112±2.88, 2070±4.33 and 4060±11.55 mL H₂/(g·min) for 0.0380, 0.0758, and 0.1516 g of NaBH₄, respectively.

Effect of Temperature

Temperature has a direct effect on the production rate of the H₂ from NaBH₄ methanolysis. To study the effect of temperature on the hydrogen generation rate, it was observed that the reaction was complete after 1hr at 0° C. But when we increased the temperature, the hydrogen generation rate was increased using the same amount of Alg-P-starch catalyst, NaBH$_4$ and methanol and thus hydrogen generation was higher at higher temperatures. At room temperature the reaction was completed in 10 min. The reaction was 100% completed in 4 min at 50° C. indicating high reactivity during methanolysis. The increase in hydrogen generation rates at higher temperature can be explained by the fact that high temperature provides energy to overcome the kinetic stabilization of the intermediates and provides internal percolation of solvents so that reaction rates are increased. The reaction is exothermic, and hence the reaction speeds up as the reaction proceeds. Temperature thus has great effect on the methanolysis reaction as shown in (FIG. 8). Further activation energy was calculated from the Arrhenius equation graph (lnk verses 1/T) which was found to be 18.86 kJmol$^{-1}$K$^{-1}$ which was the lowest activation energy shown by Alg-P-Starch catalyst.

Effect of Surfactants

We also tested our catalyst with some surfactants like, Brij™-56, P-F-127, PEG, CA, SDS and T-X-100. We tested the Alg-P-starch catalyst along with 50 µl of 10 mM aqueous solution of these surfactants. The same volume of H$_2$ was produced by Brij™-56, P-F-127, PEG, CA, SDS and T-X-100 in 8, 5, 7, 6, and 9 min, respectively (FIG. 9). Thus, it was concluded that surfactants have very positive role on the catalytic activity of Alg-P-starch catalyst. Surfactants enhanced the rate of hydrogen generation reaction and thus the surfactants showed a great positive effect on H$_2$ generation. The calculated HGR values in the presence of the different surfactants at almost 60% conversion were 2920±10, 3900±16, 4100±16, 4200±20, 4400±14, and 4600±17 ml H$_2$/(g·min) using 0.025 g of Alg-P-Starch hydrogel beads along with T-X-100, PEG, Brij™-56, CA, SDS, and P-F-127 respectively.

Recyclability

Figure 10:
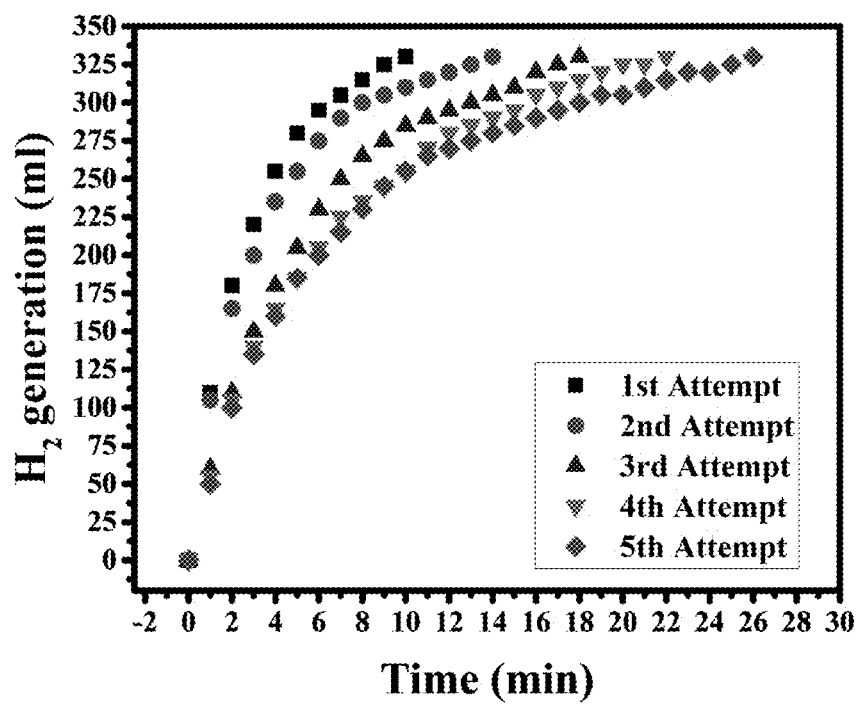
FIG. 10. Recyclability attempts for $H_2$ generation by methanolysis of $NaBH_4$ using Alg-P-Starch as catalyst.

Recyclability of a catalyst is one of its essential properties and refers to the ability to recover and reuse the catalyst easily after a reaction. Therefore, the reusability of the Alg-P-starch catalyst was investigated for practical applications. Alg-P-starch catalyst was investigated catalytically for the generation of H$_2$ from NaBH$_4$ methanolysis. After each cycle, the catalyst was removed from the reaction media through simple filtration. Before using it for the next run it was rinsed two times with distilled water to remove the surplus CH$_3$OH molecules and re-used with a fresh solution of methanol and NaBH$_4$ at room temperature, e.g. for five consecutive cycles. FIG. 10 shows the H$_2$ production from NaBH$_4$ methanolysis for multiple cycles of use. As shown, there is a slight delay in time for completion of the reaction after recycling but the level of catalysis remained high. This result indicates that the Alg-P-starch catalyst is a stable catalyst and can be recycled and still generate an efficient amount of hydrogen.

Alg-P-Starch Catalyst in Hydrolysis

Figure 11:
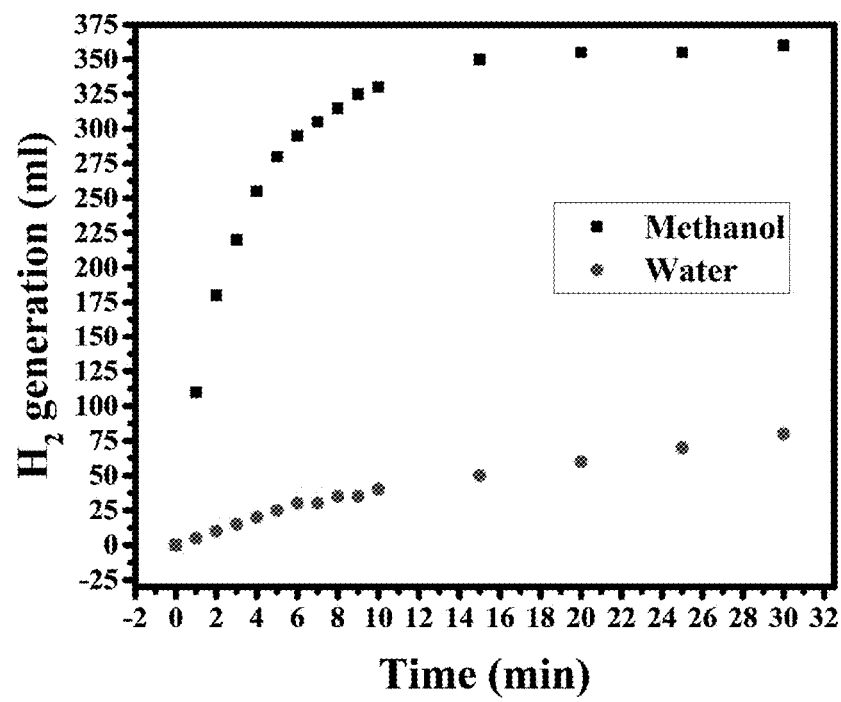
FIG. 11. $H_2$ generation by hydrolysis and methanolysis of $NaBH_4$ using Alg-P-Starch as the catalyst.

Further, the Alg-P-starch catalyst was checked for NaBH$_4$ hydrolysis to produce H$_2$ from water. For hydrogen production, the Alg-P-starch catalyst was tested in an aqueous reaction media using 0.1516 g of NaBH$_4$ in 40 mL of distilled water with and without catalyst. The reaction was very slow as compared to methanolysis but still produced 80 ml of H$_2$ gas in 30 min, as shown in FIG. 11. Thus, Alg-P-starch is also an effective catalyst for production of H$_2$ via NaBH$_4$ hydrolysis.

While the invention has been described in terms of its several exemplary embodiments, those skilled in the art will recognize that the invention can be practiced with modification within the spirit and scope of the appended claims. Accordingly, the present invention should not be limited to the embodiments as described above but should further include all modifications and equivalents thereof within the spirit and scope of the description provided herein.

REFERENCES

[1] J. Turner, G. Sverdrup, M. K. Mann, P. Maness, B. Kroposki, M. Ghirardi, R. J. Evans, D. Blake, Renewable hydrogen production, (2008) 379-407. https://doi.org/10.1002/er.

[2] S. S. Muir, X. Yao, Progress in sodium borohydride as a hydrogen storage material: development of hydrolysis catalysts and reaction systems, Int. J. Hydrog. Energy. 36 (2011) 5983-5997.

[3] S. Demirci, N. Sahiner, Superior reusability of metal catalysts prepared within poly (ethylene imine) microgels for H$_2$ production from NaBH$_4$ hydrolysis, Fuel Process. Technol. 127 (2014) 88-96.

[4] W. Cai, H. Wang, L. Jiao, Y. Wang, M. Zhu, Remarkable irreversible and reversible dehydrogenation of LiBH4 by doping with nanosized cobalt metalloid compounds, Int. J. Hydrog. Energy. 38 (2013) 3304-3312.

[5] J. M. Huang, L. Z. Ouyang, Y. J. Wen, H. Wang, J. W. Liu, Z. L. Chen, M. Zhu, Improved hydrolysis properties of Mg3RE hydrides alloyed with Ni, Int. J. Hydrog. Energy. 39 (2014) 6813-6818.

[6] L. Z. Ouyang, J. M. Huang, C. J. Fang, Q. A. Zhang, D. L. Sun, M. Zhu, The controllable hydrolysis rate for LaMg12 hydride, Int. J. Hydrog. Energy. 37 (2012) 12358-12364.

[7] H. Zhong, H. Wang, J. W. Liu, D. L. Sun, F. Fang, Q. A. Zhang, L. Z. Ouyang, M. Zhu, Enhanced hydrolysis properties and energy efficiency of MgH2-base hydrides, J. Alloys Compd. 680 (2016) 419-426.

[8] C.-C. Cormos, Hydrogen production from fossil fuels with carbon capture and storage based on chemical looping systems, Int. J. Hydrog. Energy. 36 (2011) 5960-5971.

[9] C. M. Kalamaras, A. M. Efstathiou, Hydrogen production technologies: current state and future developments, in: Conf. Pap. Sci., Hindawi, 2013.

[10] M. K. Cohce, I. Dincer, M. A. Rosen, Energy and exergy analyses of a biomass-based hydrogen production system, Bioresour. Technol. 102 (2011) 8466-8474.

[11] K. Zeng, D Zhang, Recent progress in alkaline water electrolysis for hydrogen production and applications, Prog. Energy Combust. Sci. 36 (2010) 307-326.

[12] A. S. Joshi, I. Dincer, B. V. Reddy, Solar hydrogen production: a comparative performance assessment, Int. J. Hydrog. Energy. 36 (2011) 11246-11257.

[13] M. Granovskii, I. Dincer, M. A. Rosen, Greenhouse gas emissions reduction by use of wind and solar energies for hydrogen and electricity production: economic factors, Int. J. Hydrog. Energy. 32 (2007) 927-931.

[14] J. Yu, M. Tan, P. K. Liu, M. Sahimi, T. T. Tsotsis, Hydrogen production from biomass-derived syngas using a membrane reactor based process, Ind. Eng. Chem. Res. 53 (2014) 819-827.

[15] M. F. Hordeski, Hydrogen & Fuel Cells: Advances in Transportation and Power, Crc Press, 2020.

[16] J.-H. Kim, S.-A. Jin, J.-H. Shim, Y. W. Cho, Thermal decomposition behavior of calcium borohydride Ca (BH$_4$) 2, J. Alloys Compd. 461 (2008) L20-L22.

[17] J. Mao, Z. Guo, C. K. Poh, A. Ranjbar, Y. Guo, X. Yu, H. Liu, Study on the dehydrogenation kinetics and thermodynamics of Ca (BH4) 2, J. Alloys Compd. 500 (2010) 200-205.

[18] L.-L. Wang, D. D. Graham, I. M. Robertson, D. D. Johnson, On the reversibility of hydrogen-storage reactions in Ca ($BH_4$) 2: characterization via experiment and theory, J. Phys. Chem. C. 113 (2009) 20088-20096.

[19] C. M. Jensen, D. Sun, S. S. Raman, K. Murphy, W. P. Niemczura, K. K. Kumashiro, M. Eberhard, Z. Wang, X.-Q. Gu, Catalytically enhanced systems for hydrogen storage, in: Proc. 1999 US DOE Hydrog. Program Rev. NRELCP-610-32405, 2002.

[20] R. Chandra, R. Rustgi, Biodegradable polymers, Prog. Polym. Sci. 23 (1998) 1273-1335.

[21] S. C. Amendola, S. L. Sharp-Goldman, M. S. Janjua, M. T. Kelly, P. J. Petillo, M. Binder, An ultrasafe hydrogen generator: aqueous, alkaline borohydride solutions and Ru catalyst, J. Power Sources. 85 (2000) 186-189.

[22] J. C. Walter, A. Zurawski, D. Montgomery, M. Thornburg, S. Revankar, Sodium borohydride hydrolysis kinetics comparison for nickel, cobalt, and ruthenium boride catalysts, J. Power Sources. 179 (2008) 335-339.

[23] L. Z. Ouyang, H. Zhong, Z. M. Li, Z. J. Cao, H. Wang, J. W. Liu, X. K. Zhu, M. Zhu, Low-cost method for sodium borohydride regeneration and the energy efficiency of its hydrolysis and regeneration process, J. Power Sources. 269 (2014) 768-772.

[24] H. I. Schlesinger, H. C. Brown, A. E. Finholt, J. R. Gilbreath, H. R. Hoekstra, E. K. Hyde, Sodium borohydride, its hydrolysis and its use as a reducing agent and in the generation of hydrogenl, J. Am. Chem. Soc. 75 (1953) 215-219.

[25] L. Yu, P. Pellechia, M. A. Matthews, Kinetic models of concentrated $NaBH_4$ hydrolysis, Int. J. Hydrog. Energy. 39 (2014) 442-448.

[26] Y. Kojima, Y. Kawai, H. Nakanishi, S. Matsumoto, Compressed hydrogen generation using chemical hydride, J. Power Sources. 135 (2004) 36-41.

[27] Y.-H. Huang, C.-C. Su, S.-L. Wang, M.-C. Lu, Development of $Al_2O_3$ carrier-Ru composite catalyst for hydrogen generation from alkaline $NaBH_4$ hydrolysis, Energy. 46 (2012) 242-247.

[28] T. Turhan, Y. G. Avcibasi, N. Sahiner, Versatile p (3-sulfopropyl methacrylate) hydrogel reactor for the preparation of Co, Ni nanoparticles and their use in hydrogen production, J. Ind. Eng. Chem. 19 (2013) 1218-1225.

[29] H. Cai, L. Liu, Q. Chen, P. Lu, J. Dong, Ni-polymer nanogel hybrid particles: A new strategy for hydrogen production from the hydrolysis of dimethylamine-borane and sodium borohydride, Energy. 99 (2016) 129-135.

[30] L. Zhao, Q. Li, Y. Su, Q. Yue, B. Gao, A novel Enteromorpha based hydrogel for copper and nickel nanoparticle preparation and their use in hydrogen production as catalysts, Int. J. Hydrog. Energy. 42 (2017) 6746-6756.

[31] M. S. İzgi, Ö. Sahin, C. Saka, Hydrogen production from $NaBH_4$ using Co—Cu—B catalysts prepared in methanol: Effect of plasma treatment, Int. J. Hydrog. Energy. 41 (2016) 1600-1608.

[32] M. H. Loghmani, A. F. Shojaei, M. Khakzad, Hydrogen generation as a clean energy through hydrolysis of sodium borohydride over Cu—Fe—B nano powders: Effect of polymers and surfactants, Energy. 126 (2017) 830-840.

We claim:

1. A catalytic composition for accelerated generation of $H_2$ from $NaBH_4$ comprising
   catalytic hydrogel beads comprising crosslinked alginate and starch, and water or methanol wherein the catalytic composition further comprises at least one surfactant.

2. The catalytic composition of claim 1, wherein the at least one surfactant is sodium dodecyl sulfate (SDS), polyethylene glycol (PEG), t-octylphenoxypolyethoxyethanol, olyoxyethylene (20) cetyl ether, $(C_3H_6O.C_2H_4O)x$ or citric acid (CA).

3. The catalytic composition of claim 1 wherein the starch is potato starch.

4. The catalytic composition of claim 1, wherein the dimensions of the catalytic hydrogel beads range from 100 mm to 200 mm.

5. The catalytic composition of claim 1, wherein the catalytic hydrogel beads are recyclable.

6. A method of generating $H_2$ from $NaBH_4$, comprising contacting the $NaBH_4$ with the catalytic composition of claim 1.

7. The method of claim 6, wherein the method is conducted with water and the $H_2$ is generated by hydrolysis of the $NaBH_4$.

8. The method of claim 6, wherein the method is conducted with methanol and the $H_2$ is generated by methanolysis of the $NaBH_4$.

9. The method of claim 6, further comprising the steps of recovering the catalytic hydrogel beads, then
   washing the catalytic hydrogel beads, and then
   repeating the step of contacting with washed catalytic hydrogel beads.

10. The method of claim 9, wherein the steps of recovering, washing and repeating are performed a plurality of times.

* * * * *